United States Patent
Fukuoka et al.

(10) Patent No.: US 11,762,374 B2
(45) Date of Patent: Sep. 19, 2023

(54) DATA GENERATION DEVICE, MACHINE LEARNING SYSTEM, AND MACHINING STATE ESTIMATION SYSTEM

(71) Applicant: Mitsubishi Electric Corporation, Tokyo (JP)

(72) Inventors: Teruaki Fukuoka, Tokyo (JP); Nobuaki Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/918,910

(22) PCT Filed: May 20, 2020

(86) PCT No.: PCT/JP2020/020006
§ 371 (c)(1),
(2) Date: Oct. 14, 2022

(87) PCT Pub. No.: WO2021/234876
PCT Pub. Date: Nov. 25, 2021

(65) Prior Publication Data
US 2023/0124877 A1    Apr. 20, 2023

(51) Int. Cl.
*G05B 19/418*    (2006.01)

(52) U.S. Cl.
CPC ... *G05B 19/4183* (2013.01); *G05B 19/41885* (2013.01)

(58) Field of Classification Search
CPC ............... G05B 19/4183; G05B 19/41885
See application file for complete search history.

(56) References Cited

U.S. PATENT DOCUMENTS

2003/0065481 A1*  4/2003  Fujishima ............ G05B 19/404
                                                              702/182
2017/0060104 A1*  3/2017  Genma ............... G05B 13/0265
(Continued)

FOREIGN PATENT DOCUMENTS

JP          8-95592 A      4/1996
JP      2019-139554 A      8/2019
(Continued)

OTHER PUBLICATIONS

International Search Report and Written Opinion dated Sep. 8, 2020, received for PCT Application PCT/JP2020/020006, filed on May 20, 2020, 9 pages including English Translation.
(Continued)

*Primary Examiner* — Christopher E. Everett
(74) *Attorney, Agent, or Firm* — XSENSUS LLP

(57) ABSTRACT

A data generation device includes a large-scale data acquisition unit that obtains large-scale data that is large-scale learning data used in learning of a first determination model for determining a machining state of a workpiece machined by a first machine tool; an adaptive data acquisition unit that obtains adaptive data for use in generation of learning data for use in learning of a second determination model for determining a machining state of a workpiece machined by a second machine tool; and a learning data generation unit that converts the large-scale data based on the adaptive data to generate adapted large-scale data for use in learning of the second determination model.

9 Claims, 6 Drawing Sheets

(56) References Cited

U.S. PATENT DOCUMENTS

| | | | |
|---|---|---|---|
| 2018/0018538 A1 | 1/2018 | Ishii | |
| 2018/0181114 A1* | 6/2018 | Masakawa | G06N 20/00 |
| 2018/0224808 A1* | 8/2018 | Tong | G05B 19/41855 |
| 2019/0391554 A1 | 12/2019 | Huang et al. | |
| 2020/0033842 A1* | 1/2020 | Masuda | G05B 19/4183 |
| 2020/0401943 A1 | 12/2020 | Kawachi et al. | |
| 2021/0354234 A1 | 11/2021 | Tanaka et al. | |

FOREIGN PATENT DOCUMENTS

| | | |
|---|---|---|
| JP | 2019-220164 A | 12/2019 |
| JP | 6644201 B1 | 2/2020 |
| WO | 2016/125500 A1 | 8/2016 |

OTHER PUBLICATIONS

Decision to Grant dated Dec. 1, 2020, received for JP Application 2020-563737, 5 pages including English Translation.

* cited by examiner

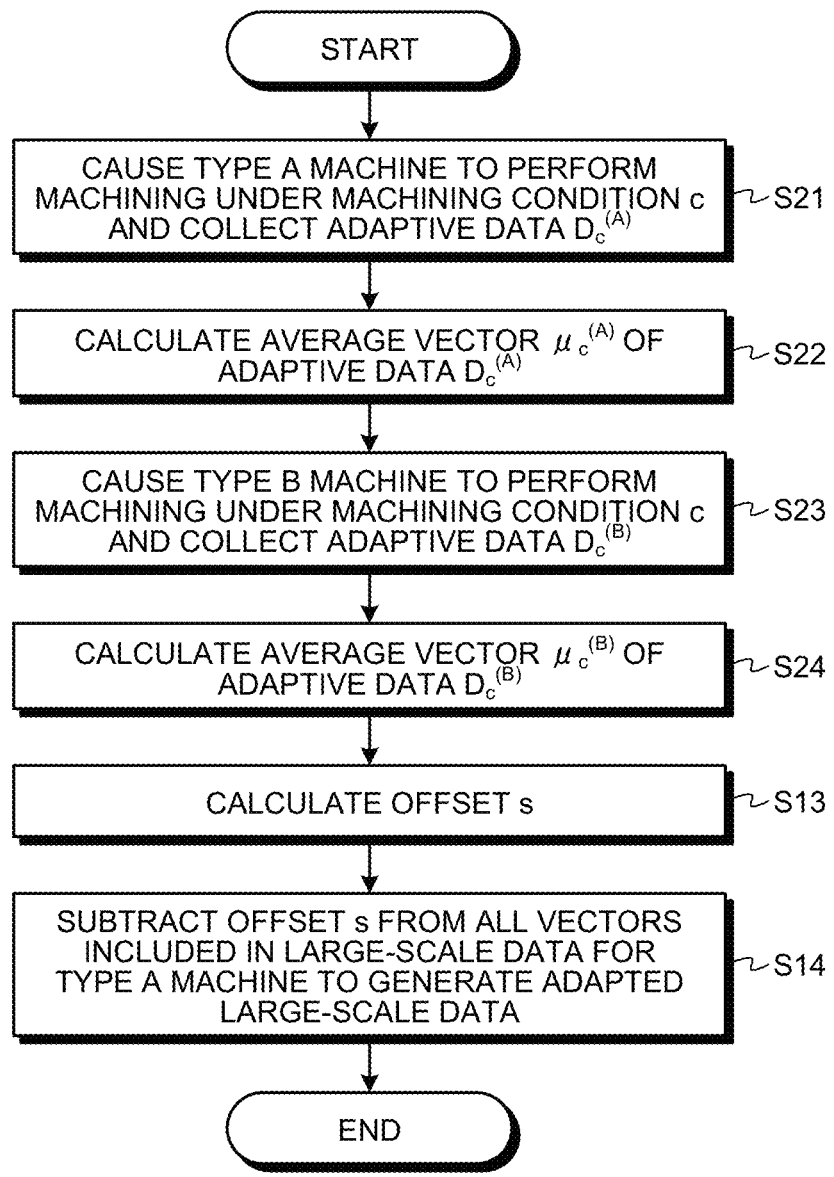

DATA GENERATION DEVICE, MACHINE LEARNING SYSTEM, AND MACHINING STATE ESTIMATION SYSTEM

CROSS-REFERENCE TO RELATED APPLICATION

The present application is based on PCT filing PCT/JP2020/020006, filed May 20, 2020, the entire contents of which is incorporated herein by reference.

FIELD

The present disclosure relates to a data generation device that generates data for use in machine learning of a model for estimating a machining state when a workpiece is machined by a machine tool such as a laser processing machine, and to a machine learning system and a machining state estimation device.

BACKGROUND

When an anomaly occurs during machining, a machine tool informs the outside world of this occurrence of anomaly, temporarily stops the machining, etc. Various methods may be used to detect occurrence of an anomaly, one of which is to detect occurrence of an anomaly on the basis of a sound produced during machining. This method uses a difference in sound between normal machining and anomalous machining to determine whether the machining is normal or anomalous.

For example, Patent Literature 1 describes a technology for detecting an anomaly of a machine by observing the operating sound of the machine, using an acoustic sensor such as a microphone. Specifically, Patent Literature 1 describes a model learning device that learns a model for detecting an anomaly from observation data obtained by observation of the operating sound of a machine.

CITATION LIST

Patent Literature

Patent Literature 1: Japanese Patent Application Laid-open No. 2019-139554

SUMMARY

Technical Problem

To determine whether the machining state is a normal state or an anomalous state on the basis a model learned using sound observation data, the transmission characteristic from a determination target device, i.e., a sound source to an acoustic sensor needs to be common both during the learning and during the operation. For example, when a model learned using sound observation data for some device is utilized for another type of device having functionality equivalent to the functionality of that device, the transmission characteristic (hereinafter be referred to as acoustic characteristic) from the sound source to the acoustic sensor changes because of the difference in the device type such as a difference in the device shape, and a difference in the position of placement of the acoustic sensor. This results in a problem of a reduction in accuracy of determination. Such a change in the acoustic characteristic is the problem particularly when a difference between sound in the normal machining state and sound in the anomalous machining state is small, such as when a determination is made about dross generation for a laser processing machine. To prevent the reduction in accuracy of determination, a sufficient amount of observation data needs to be collected for each device type, and a model needs to be learned on a device type-by-device type basis.

In most cases, unfortunately, generation of learning data for learning a model is costly. The generation of learning data for each of different device types requires collecting data necessary for generating the learning data, on a device type-by-device type basis. To this end, a large number of human resources and a large amount of time resource are required.

The foregoing description has been directed to use of observation data on sound produced during machining to determine whether machining is normal, but a similar problem arises in a case of use of observation data on vibration produced during machining to determine whether machining is normal.

The present disclosure has been made in view of the foregoing, and it is an object of the present disclosure to provide a data generation device that can reduce cost required to generate learning data.

Solution to Problem

To solve the above problem and achieve the object, the present disclosure provides a data generation device to generate learning data for learning a determination model for estimating a machining state of a workpiece on a basis of: observation data on at least one of a sound and a vibration produced during machining on the workpiece by a machine tool; and a machining condition used in the machining on the workpiece by the machine tool, the data generation device comprising: a large-scale data acquisition unit to obtain large-scale data, the large-scale data being large-scale learning data used in learning of a first determination model for determining a machining state of a workpiece machined by a first machine tool; and an adaptive data acquisition unit to obtain adaptive data for use in generation of learning data for use in learning of a second determination model for determining a machining state of a workpiece machined by a second machine tool. The data generation device also comprises a learning data generation unit to convert the large-scale data on the basis of the adaptive data to generate adapted large-scale data for use in learning of the second determination model.

Advantageous Effects of Invention

A data generation device according to the present disclosure provides an advantage in being capable of reducing cost required to generate learning data.

BRIEF DESCRIPTION OF DRAWINGS

FIG. 7 is a flowchart illustrating an operation of generating adapted large-scale data performed by the data generation device according to the second embodiment.

DESCRIPTION OF EMBODIMENTS

A data generation device, a machine learning system, and a machining state estimation device according to embodiments of the present disclosure will be described in detail below with reference to the drawings. The following description of each of the embodiments is directed to a data generation device that generates learning data for use in a process of learning a relationship among a machining sound, which is a sound produced when a machine tool machines a workpiece, a machining condition, and a machining state of the workpiece. The embodiments will each be described assuming that the machine tool is a laser processing machine by way of example, but the machine tool is not limited to a laser processing machine. The machine tool can be a processing machine that produces a sound during machining, such as an electrical discharge machining tool or a lathe machining tool. In addition, the following description will be provided using an example of a case of learning a machining sound produced when a machine tool machines a workpiece, but instead of learning a machining sound, a machining vibration may be learned. A machining vibration is a vibration of a workpiece produced during machining. Moreover, a machining sound and a machining vibration may both be learned. That is, at least one of a machining sound and a machining vibration produced when a machine tool machines a workpiece is learned.

First Embodiment

Figure 1:
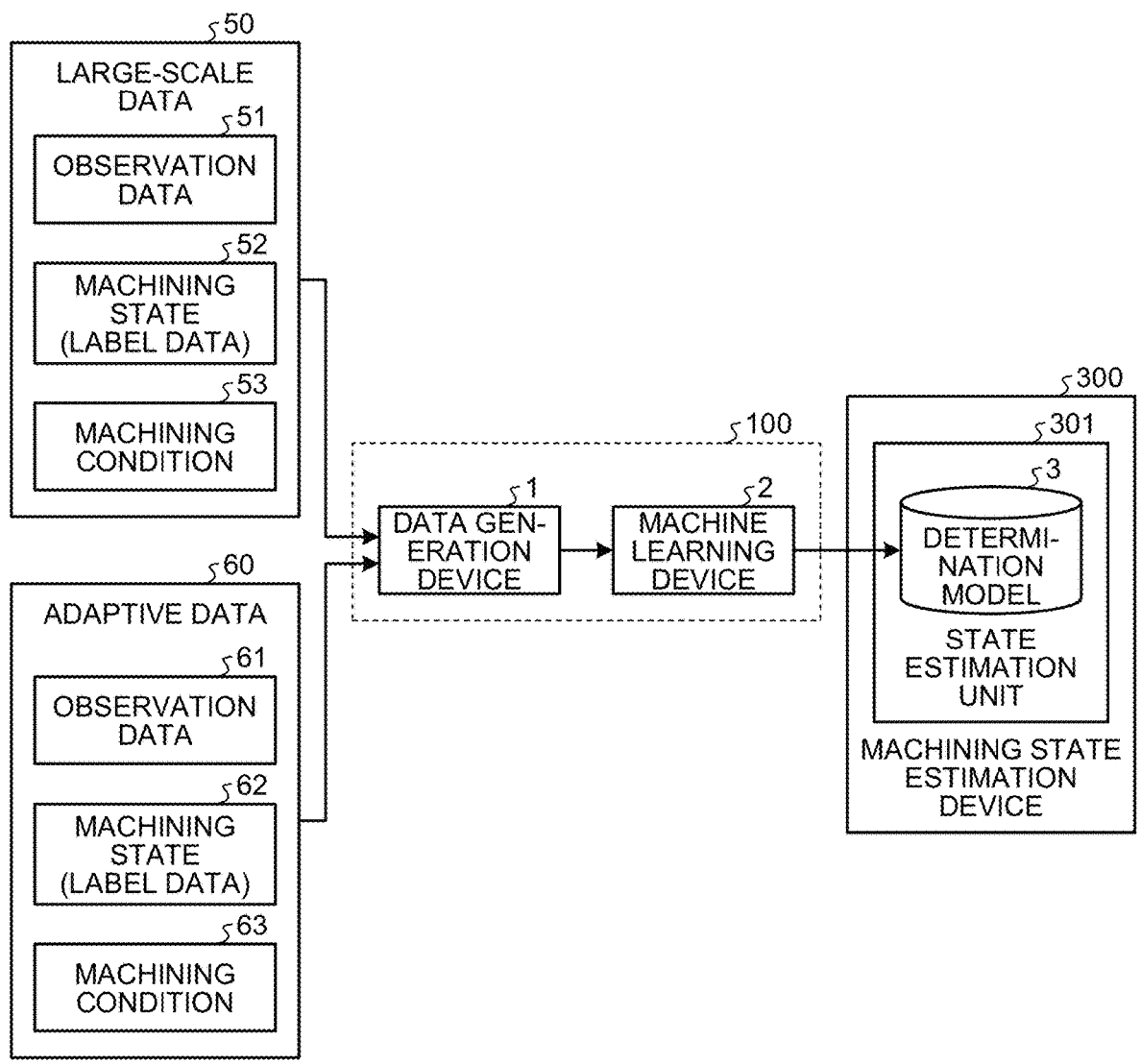
FIG. 1 is a diagram illustrating an example of a machine learning system configured to include a data generation device according to a first embodiment.

FIG. 1 is a diagram illustrating an example of a machine learning system configured to include a data generation device according to a first embodiment. A machine learning system 100 includes a data generation device 1 and a machine learning device 2. The data generation device 1 generates learning data on the basis of large-scale data 50 and adaptive data 60. The machine learning device 2 generates a determination model 3 by performing machine learning, using the learning data generated by the data generation device 1. The determination model 3 is used in a machining state estimation device 300. The machining state estimation device 300 estimates a machining state of a workpiece on the basis of a machining condition, and a machining sound produced when a machine tool (not illustrated) machines the workpiece. The machining state estimation device 300 includes a state estimation unit 301. The state estimation unit 301 estimates the machining state, using the determination model 3.

In this respect, when learning data has been collected in a laser processing machine of some type is in an enough amount to provide a sufficient accuracy of determination, such learning data is referred to as "large-scale data". The large-scale data 50 input to the data generation device 1, which is collected in a laser processing machine of device type A, is large-scale learning data, i.e., a large amount of learning data for device type A. The laser processing machine of device type A is defined as a first machine tool. In other words, the large-scale data 50 is large-scale learning data used in learning a first determination model that is a determination model for determining a machining state of a workpiece machined by a laser processing machine of device type A.

The large-scale data 50 includes observation data 51, machining state data 52, and machining condition data 53. The observation data 51 is output from an acoustic sensor, such as a microphone, for observing a machining sound produced when the laser processing machine of device type A machines the workpiece. The machining state data 52 is label data showing a machining state of the machined workpiece. The machining condition data 53 represents various operation parameters set in the machining. The observation data 51, the machining state data 52, and the machining condition data 53 are associated with one another. That is, the observation data 51 observed at a certain time point during machining is associated with the machining state data 52 and the machining condition data 53 at that time point. Note that the observation data 51 may be data representing a result of observation of machining vibration produced during machining, or data representing a result of observation of both machining sound and machining vibration. The machining state data 52 represents whether machining has been performed normally or an anomaly has occurred. When an anomaly has occurred, the machining state data 52 also represents the type of anomaly. Examples of the type of anomaly include dross and gouging in a case in which the machine tool is a laser processing machine, and a crack and an unusual arc in a case in which the machine tool is an electrical discharge machining tool. In the case in which the machine tool is a laser processing machine, examples of the operation parameters represented by the machining condition data 53 include the gas pressure, the laser power, the frequency of the laser beam, and the machining speed. In the case in which the machine tool is an electrical discharge machining tool, examples of the operation parameters represented by the machining condition data 53 include the machining voltage, the machining current, the voltage pulse width, and the machining speed. As the machining state data 52 includes information on the type of anomaly as well, it is possible to generate a determination model 3 capable of estimating what kind of anomaly is occurring upon occurrence of that anomaly. That is, it is possible to improve accuracy of estimation of an anomalous state of the machining state.

The adaptive data 60 includes observation data 61, machining state data 62, and machining condition data 63, which are similar to the observation data 51, the machining state data 52, and the machining condition data 53, respectively, included in the large-scale data 50. This adaptive data 60 is data collected when a workpiece was machined by a laser processing machine of device type B. The laser processing machine of device type B is defined as a second machine tool. The adaptive data 60 is similar in structure to the large-scale data 50 for device type A, but is small in amount unlike the large-scale data 50. That is, although the adaptive data 60 can be used as learning data for device type B, the adaptive data 60 is not in the enough amount to provide sufficient accuracy of determination. Thus, as described later, the data generation device 1 according to the present embodiment uses the adaptive data 60 to generate a sufficient amount of device type B learning data, i.e., generate device type B learning data in an enough amount to provide sufficient accuracy of determination.

Note that, for convenience of description, the laser processing machine of device type A may be hereinafter simply referred to as "device type A", and the laser processing machine of device type B may be hereinafter be simply referred to as "device type B".

On the basis of the large-scale data 50 and the adaptive data 60 input to the data generation device 1, the data generation device 1 generates learning data in an amount that allows the machine learning device 2 to perform sufficient machine learning for the device type B. Specifically, using the large-scale data 50 collected during machining by the device type A and the adaptive data 60 collected during machining by the device type B, the data generation device 1 performs adaptation processing for compensating a difference between learning data for the device types, the difference resulting from the difference in the device type. More specifically, the data generation device 1 performs the adaptation processing for compensating the learning data difference that results from a difference between an acoustic characteristic of the device type A and an acoustic characteristic of the device type B. The adaptation processing includes converting a feature quantity of each piece of learning data of the large-scale data 50. Specifically, the adaptation processing includes converting a feature quantity of the observation data.

The machine learning device 2 performs machine learning, using a sufficient amount of device type B learning data generated by the data generation device 1 to thereby learn the correspondence relationship among the observation data, the machining condition, and the machining state. That is, the machine learning device 2 generates, from the observation data and the machining condition, a second determination model that is the determination model 3 for estimating the machining state of a workpiece machined by the device type B. Note that there is no limitation on the algorithm which the machine learning device 2 uses in machine learning to generate the determination model 3. Any algorithm for use in supervised learning may be used.

Figure 2:
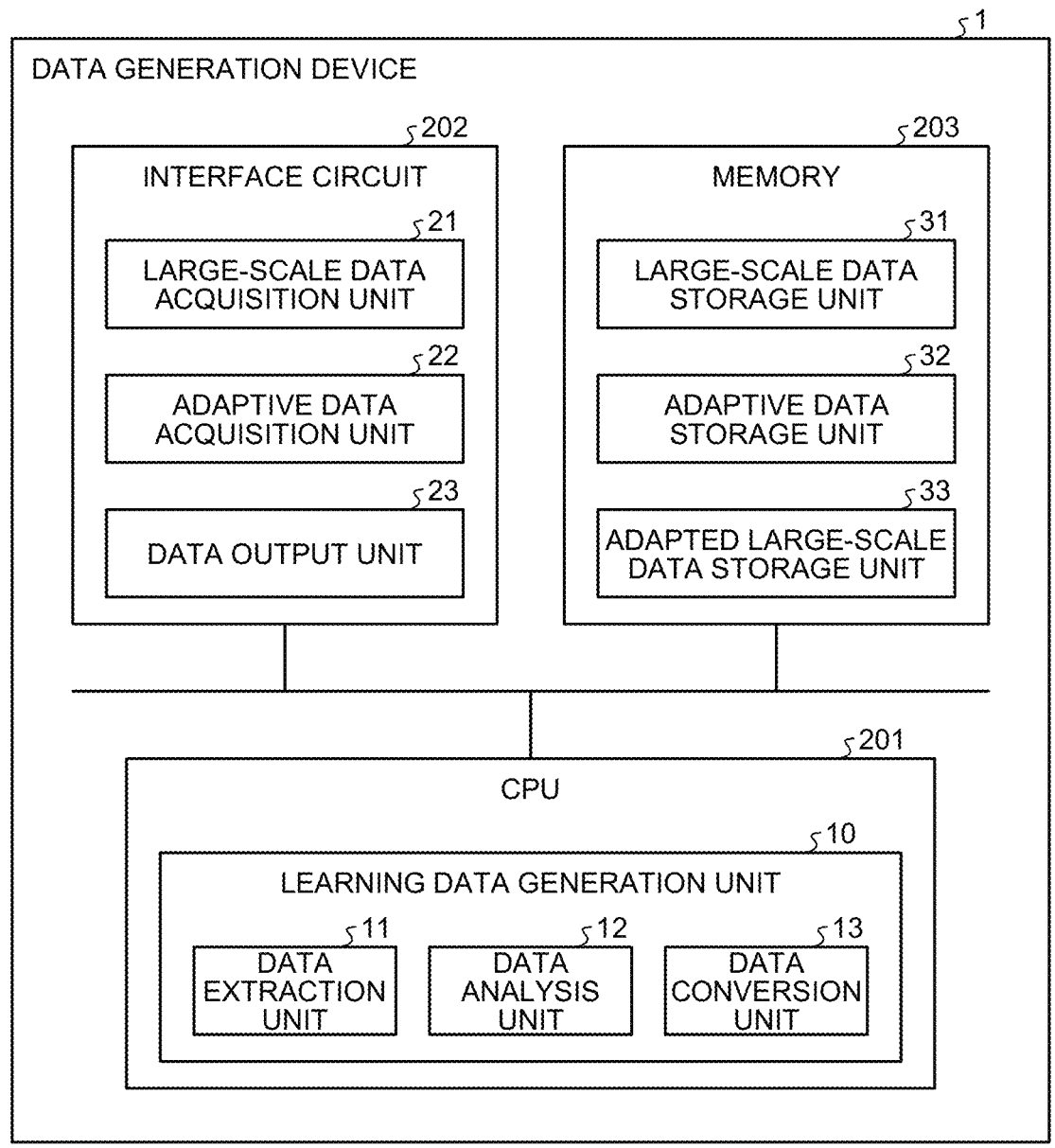
FIG. 2 is a diagram illustrating an example configuration of the data generation device according to the first embodiment.

The data generation device 1 according to the present embodiment will next be described in detail. FIG. 2 is a diagram illustrating an example configuration of the data generation device 1 according to the first embodiment. The data generation device 1 can be implemented by, for example, an electronic computer such as a personal computer. FIG. 2 illustrates an example in which the data generation device 1 is implemented by an electronic computer. As illustrated in FIG. 2, the data generation device 1 is implemented by a central processing unit (CPU) 201, an interface circuit 202, and a memory 203, of the electronic computer. The interface circuit 202 is a circuit for enabling the electronic computer to exchange data with another device. The memory 203 is a random access memory (RAM), a read-only memory (ROM), or the like.

The data generation device 1 includes a learning data generation unit 10, an adaptive data acquisition unit 22, a data output unit 23, a large-scale data storage unit 31, an adaptive data storage unit 32, and an adapted large-scale data storage unit 33. The learning data generation unit 10 is implemented by the CPU 201. The large-scale data acquisition unit 21, the adaptive data acquisition unit 22, and the data output unit 23 are implemented by the interface circuit 202. The large-scale data storage unit 31, the adaptive data storage unit 32, and the adapted large-scale data storage unit 33 are implemented by the memory 203.

In the data generation device 1, the large-scale data acquisition unit 21 obtains the large-scale data 50 illustrated in FIG. 1, and stores the large-scale data 50 in the large-scale data storage unit 31. In addition, the adaptive data acquisition unit 22 obtains the adaptive data 60 illustrated in FIG. 1, and stores the adaptive data 60 in the adaptive data storage unit 32. When the learning data generation unit 10 generates adapted large-scale data that is learning data, the adapted large-scale data storage unit 33 receives and retains the generated adapted large-scale data. The adapted large-scale data will be described in detail later. The data output unit 23 reads the adapted large-scale data from the adapted large-scale data storage unit 33, and outputs the adapted large-scale data to the machine learning device 2 illustrated in FIG. 1. Note that the data output unit 23 may also output the adaptive data to the machine learning device 2 together with the adapted large-scale data. The data output by the data output unit 23, which is the adapted large-scale data and the adaptive data, is used in machine learning by the machine learning device 2 to generate the determination model 3.

The learning data generation unit 10, which includes a data extraction unit 11, a data analysis unit 12, and a data conversion unit 13, generates the adapted large-scale data. The adapted large-scale data is data obtained by converting the large-scale data 50 for the device type A on the basis of the difference in the device type, that is, the difference in acoustic characteristic between the device type A and the device type B. The adapted large-scale data is large-scale learning data usable in machine learning targeted at the device type B. That is, the adapted large-scale data is large-scale data for the device type B.

In the learning data generation unit 10, the data extraction unit 11 extracts, from the large-scale data 50 and from the adaptive data 60, learning data satisfying a specific condition. The data analysis unit 12 analyzes the learning data extracted by the data extraction unit 11 and obtains the difference between the device type A learning data and the device type B learning data. The data conversion unit 13 performs adaptation processing for converting the large-scale data 50 on the basis of the difference obtained by the data analysis unit 12 to thereby generate the adapted large-scale data, i.e., large-scale data for the device type B. That is, the data conversion unit 13 converts a feature quantity of each piece of learning data of the large-scale data 50, on the basis of the difference obtained by the data analysis unit 12.

When the learning data generation unit 10 generates the adapted large-scale data, the data conversion unit 13 converts the feature quantity, using, for example, filter bank analysis.

Filter bank analysis is a technique for obtaining n signal power values as feature quantities by performing frequency analysis on a signal (corresponding to the observation data 51 and 61 in the present embodiment) observed by an acoustic sensor, and calculating the signal power of each of frequency bands divided into n frequency bands. In this analysis, n values are regarded as an n-dimensional vector. The determination model in this case is a model that outputs a result of estimation of the state (e.g., the machining state in the present embodiment), depending on the values of the n-dimensional vector input into the model.

Figure 3:
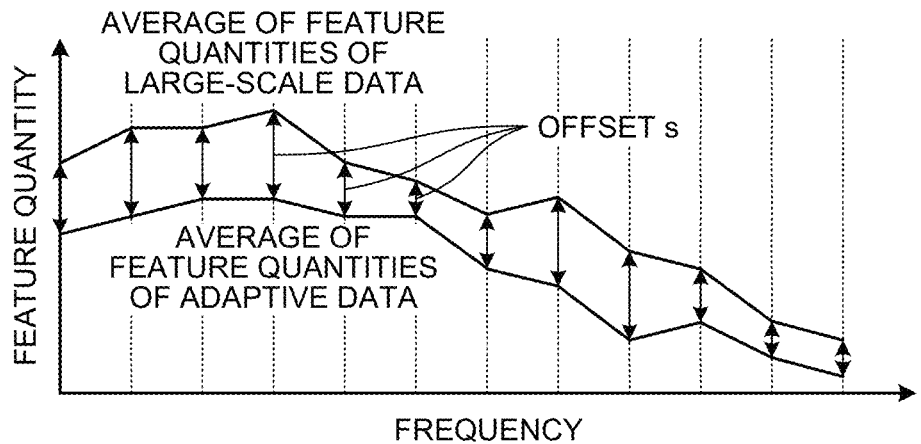
FIG. 3 is a diagram illustrating an example of relationship between large-scale data and adaptive data.

FIG. 3 is a diagram illustrating an example of relationship between the large-scale data 50 and the adaptive data 60. In more detail, FIG. 3 is a plot of an average of each of n feature quantities obtained by filter bank analysis of each piece of observation data 51 observed under a machining condition "c" included in the large-scale data 50, and an average of each of n feature quantities obtained by filter bank analysis of each piece of observation data 61 observed under the machining condition "c" included in the adaptive data 60. The average of each of n feature quantities calculated from the observation data 51 observed under the machining condition "c" is hereinafter referred to as average vector $\mu_c^{(A)}$. The average of each of n feature quantities calculated from the observation data 61 observed under the machining condition "c" is hereinafter referred to as average vector $\mu_c^{(B)}$.

In this respect, the machining condition "c" has a margin or tolerance to such an extent that machining conditions falling within that tolerance can be regarded as generally the same machining conditions. For example, each of the operation parameters represented by the machining condition "c", such as the gas pressure, the laser power, etc. has a predetermined range. In this case, the learning data generation unit 10 determines that a machining condition having its operation parameters each of which falls within that range of the corresponding operation parameter is the machining condition "c".

The difference (hereinafter referred to as offset) between the two average vectors plotted in FIG. 3 is denoted by $s=\mu_c^{(A)}-\mu_c^{(B)}$. Each of the feature quantities of the observation data 51 of the large-scale data 50 is shifted by subtraction of the offset "s" from that feature quantity to thereby generate adapted large-scale data having a variance (variation) similar to that of the large-scale data 50 and having an average characteristic similar to that of the adaptive data 60. The determination model 3 which the machine learning device 2 learns using this adapted large-scale data can be used in estimation of the machining state of a workpiece machined by the device type B. Note that the shift operation, which subtracts the offset "s" from the feature quantity of the observation data 51 of the large-scale data 50, is an example of processing of conversion of the large-scale data 50 into the adapted large-scale data. In the conversion processing of the large-scale data 50 into the adapted large-scale data, the machining state data 52 and the machining condition data 53 included in the large-scale data 50 are not converted, but maintains their original values. That is, the conversion processing of the large-scale data 50 into the adapted large-scale data is conversion processing of the feature quantities of the observation data 51 included in the large-scale data 50.

Figure 4:
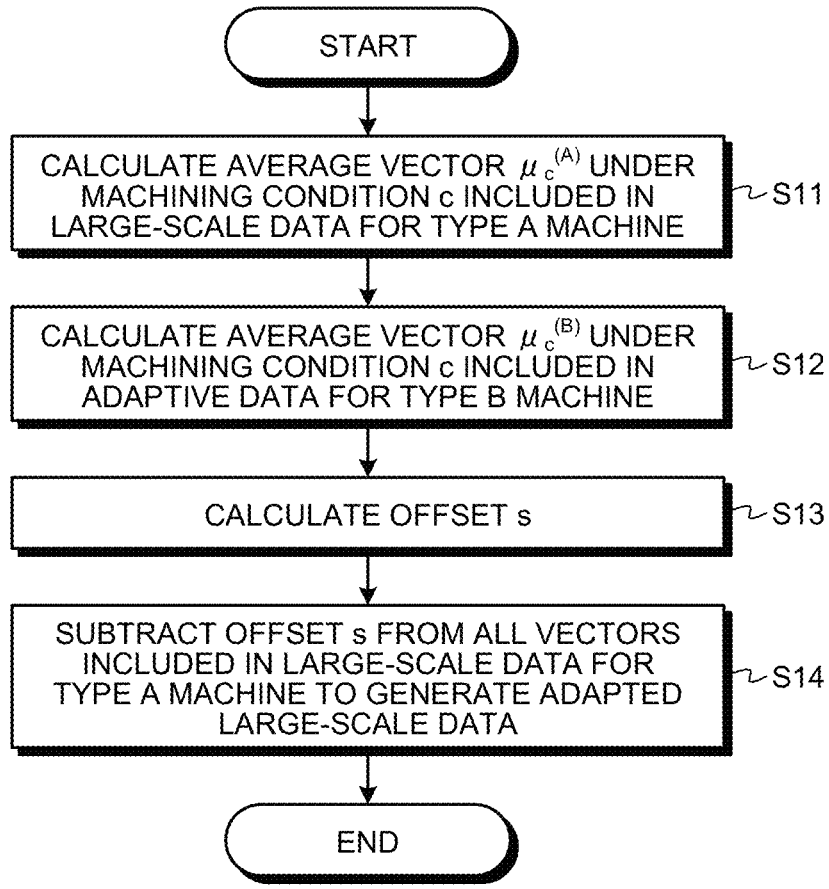
FIG. 4 is a flowchart illustrating an operation of generating adapted large-scale data performed by the data generation device according to the first embodiment.

The learning data generation unit 10 operates to generate the adapted large-scale data, using filter bank analysis, as illustrated in the flowchart of FIG. 4.

FIG. 4 is a flowchart illustrating an operation of generating adapted large-scale data performed by the data generation device 1 according to the first embodiment.

The learning data generation unit 10 first calculates the average vector $\mu_c^{(A)}$ for the machining condition "c" included in the large-scale data 50 on the device type A (step S11). At this step S11, the data extraction unit 11 extracts, from the large-scale data 50 retained in the large-scale data storage unit 31, learning data on the machining condition "c", that is, learning data on the machining condition 53 corresponding to the machining condition "c". Next, the data analysis unit 12 performs filter bank analysis of the observation data 51 on each piece of learning data extracted by the data extraction unit 11 to thereby obtain an n-dimensional feature quantity, and then calculates the average vector $\mu_c^{(A)}$ from the n-dimensional feature quantity.

The learning data generation unit 10 next calculates the average vector $\mu_c^{(B)}$ for the machining condition "c" included in the adaptive data 60 on the device type B (step S12). At this step S12, the data extraction unit 11 and the data analysis unit 12 perform operation similar to the operation performed at step S11 above, on the adaptive data 60 for the device type B to thereby calculate the average vector $\mu_c^{(B)}$.

The learning data generation unit 10 next calculates the offset "s" (step S13). Specifically, the data analysis unit 12 subtracts the average vector $\mu_c^{(B)}$ from the average vector $\mu_c^{(A)}$ to thereby obtain the offset "s".

The learning data generation unit 10 next subtracts the offset "s" from all the vectors included in the large-scale data 50 for the device type A to thereby generate the adapted large-scale data (step S14). At this step S14, first, the data analysis unit 12 performs filter bank analysis on each piece of observation data 51 in the learning data included in the large-scale data 50 for the device type A to thereby calculate the n-dimensional feature quantity (vector). In this operation, the vector for the machining condition "c", which has already been calculated at step S11 above, does not need calculating. Next, the data conversion unit 13 subtracts the offset "s" from each of the vectors calculated by the data analysis unit 12. Note that the machining state data 52 and the machining condition data 53 defining the learning data included in the large-scale data 50 for the device type A are not converted. That is, the adapted large-scale data obtained by conversion of the large-scale data 50 for the device type A includes the machining state data 52 and the machining condition data 53 included in the large-scale data 50 for the device type A.

Note that the example illustrated in FIG. 4 is where a single average vector is calculated for each device type for use in calculation of the offset "s", but the average vector is not limited thereto. For example, an average vector when the machining state is a normal state and an average vector when the machining state is an anomalous state are calculated for each of the device type A and the device type B. In such a case, to convert the large-scale data 50, an offset "s" is calculated in such a manner as to reduce the average error between the device types when the machining state is a normal state and to reduce the average error between the device types when the machining state is an anomalous state. In this operation, a weight is set in each machining state in calculation of the average errors, thereby providing weighting to preferentially improve accuracy of detection of the anomalous state.

In addition, although the example illustrated in FIG. 4 provides a simple method that takes into consideration the single machining condition "c" alone, the average vectors for several machining conditions may be calculated, and an offset "s" that minimizes the average errors among the these average vectors may be calculated for conversion. Alternatively, when a sufficient amount of adaptive data can be obtained for each of machining conditions, an offset "s" may be calculated on a machining condition-by-machining condition basis, and different conversions may be performed using different offsets "s" for different machining conditions.

As described above, in the machine learning system 100 according to the first embodiment, the data generation device 1 convert the observation data 51 included in the large-scale data 50, on the basis of the large-scale data 50 and the adaptive data 60, to generate the adapted large-scale data. The large-scale data 50, which is generated to perform learning targeted at the device type A, is the device type A learning data of an amount sufficient to generate a determination model having a desired capability. The adaptive data 60, which is generated to perform learning targeted at the device type B, is the device type B learning data of a small amount. The adapted large-scale data is device type B learning data. Specifically, the data generation device 1 extracts, from each of the large-scale data 50 and the adaptive data 60, observation data when machining is performed under a machining condition within a range of machining conditions regarded as generally the same. The data generation device 1 compares the feature quantities of the observation data extracted from the large-scale data 50 with the feature quantities of the observation data extracted from the adaptive data 60 to thereby determine an offset for use in conversion processing, and converts the observation data 51 included in the large-scale data 50. As a result, the machining and the collection of the observation data for the device type B can be practically conducted a reduced number of times, thereby reducing the cost necessary to generate learning data. In addition, this can eliminate, from the adapted large-scale data, uncertainty due to a difference between machining conditions, thereby makes it possible to learn a determination model that provides high-accuracy determination.

Second Embodiment

The foregoing first embodiment is based on the assumption that learning data is collected in advance, but a laser processing machine may automatically perform dedicated machining for collecting data for adaptation processing.

Figure 5:
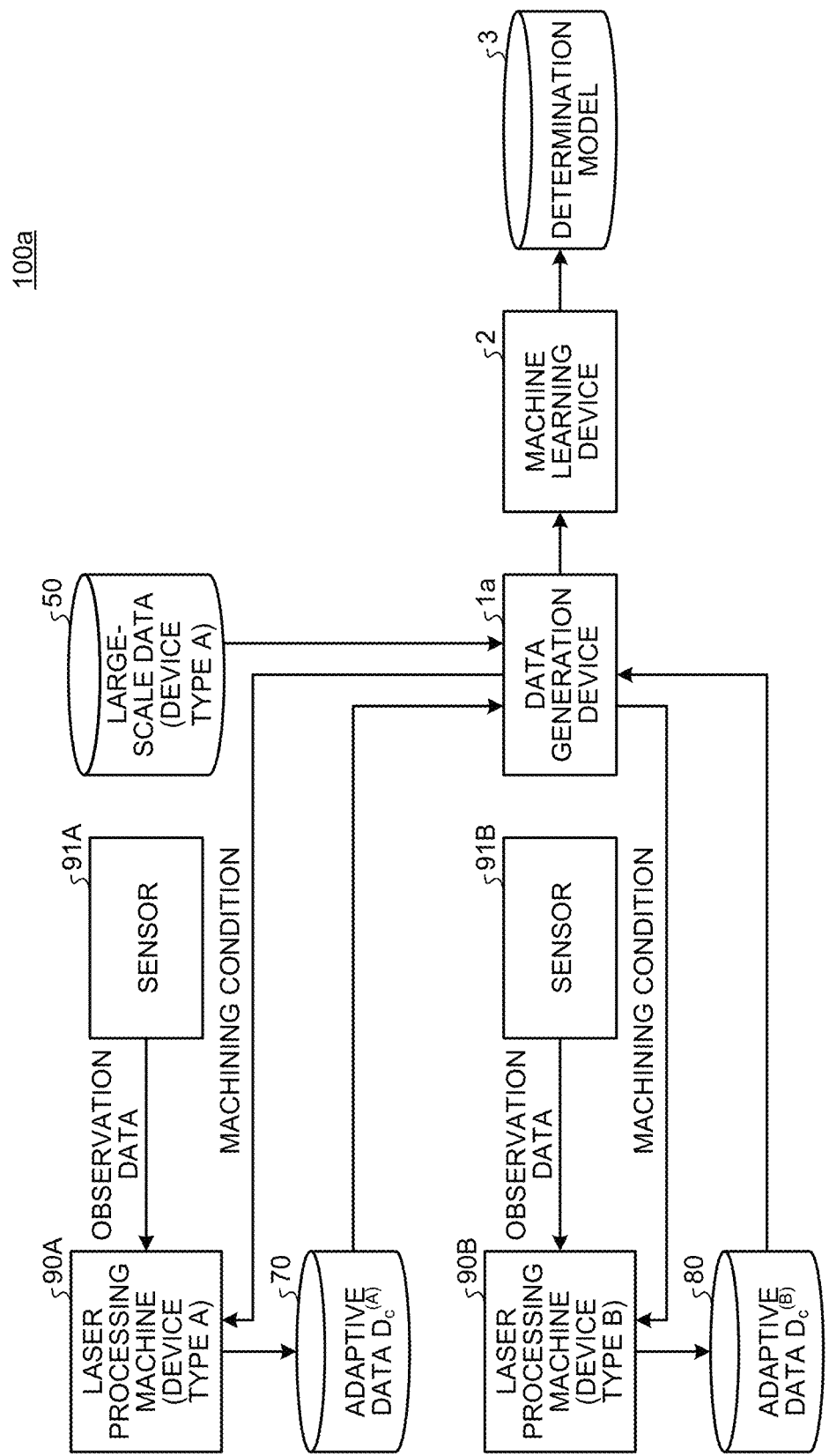
FIG. 5 is a diagram illustrating an example of a machine learning system configured to include a data generation device according to a second embodiment.

FIG. 5 is a diagram illustrating an example of a machine learning system configured to include a data generation device according to a second embodiment. In FIG. 5, the same components and data as those of the machine learning system 100 (see FIG. 1) according to the first embodiment are designated by the same reference characters as those of FIG. 1. Note that FIG. 5 omits the machining state estimation device that uses the determination model 3. The present embodiment differs from the first embodiment in the respects discussed hereinbelow.

A machine learning system 100a according to the second embodiment includes a data generation device 1a, the machine learning device 2, laser processing machines 90A and 90B, and sensors 91A and 91B.

The data generation device 1a generates adapted large-scale data similarly to the data generation device 1 of the machine learning system 100 according to the first embodiment, but partially differs in the operation of generating the adapted large-scale data.

The laser processing machine 90A, which is a laser processing machine of device type A, is the laser processing machine that was used for collecting the large-scale data 50. The laser processing machine 90A has functionality to perform machining under a machining condition specified by the data generation device 1a and generate adaptive data 70. The laser processing machine 90B, which is a laser processing machine of device type B, has functionality to perform machining under a machining condition specified by the data generation device 1a and generate adaptive data 80, as in the laser processing machine 90A. The adaptive data 70 and 80 each have a structure similar to the structure of the adaptive data 60 of the first embodiment.

The sensor 91A is an acoustic sensor or a vibration sensor attached to the laser processing machine 90A. The sensor 91A observes a machining sound or a machining vibration produced when the laser processing machine 90A is performing machining, and generates observation data. The observation data generated by the sensor 91A is sent to the laser processing machine 90A for use in generation of the adaptive data 70. Similarly, the sensor 91B is an acoustic sensor or a vibration sensor attached on the laser processing machine 90B. The sensor 91B observes a machining sound or a machining vibration produced when the laser processing machine 90B is performing machining, and generates observation data. The observation data generated by the sensor 91B is sent to the laser processing machine 90B for use in generation of the adaptive data 80.

An overall operation of the machine learning system 100a will now be briefly described. In the machine learning system 100a, first, the data generation device 1a instructs the device type A and the device type B to perform machining under the machining condition "c" and collect adaptive data. Upon reception of this instruction, the device type A and the device type B each automatically perform machining under the machining condition "c" and collect observation data during the machining. The machining condition "c" is herein defined as including the material of a workpiece and the shape of a product to be produced by machining. Thus, the device type A and the device type B machine workpieces of the same material into the same shapes. As the device type A and the device type B perform machining under the same machining condition "c", the difference between the observation data collected by the device type A and the observation data collected by the device type B result from no factor other than the difference in the device types. Accordingly, performing adaptation processing, using these pieces of observation data enables converting the large-scale data 50 more precisely. The device type A and the device type B each associate the collected observation data with the machining condition "c" and the machining state and generate the adaptive data 70 and 80 (adaptive data $D_c^{(A)}$ and $D_c^{(B)}$), respectively. Note that the data on the machining state is generated by, for example, operator's visual checking of the machining state of the workpiece. The data generation device 1a performs adaptation processing, using the adaptive data 70 and 80 respectively generated by the device type A and the device type B to thereby generate adapted large-scale data. Although the description is based on the assumption that the machining condition "c" includes the material of the workpiece and the shape of the product to be produced by machining, the data generation device 1a may specify the material of the workpiece and the shape of the product separately from the machining condition "c".

Figure 6:
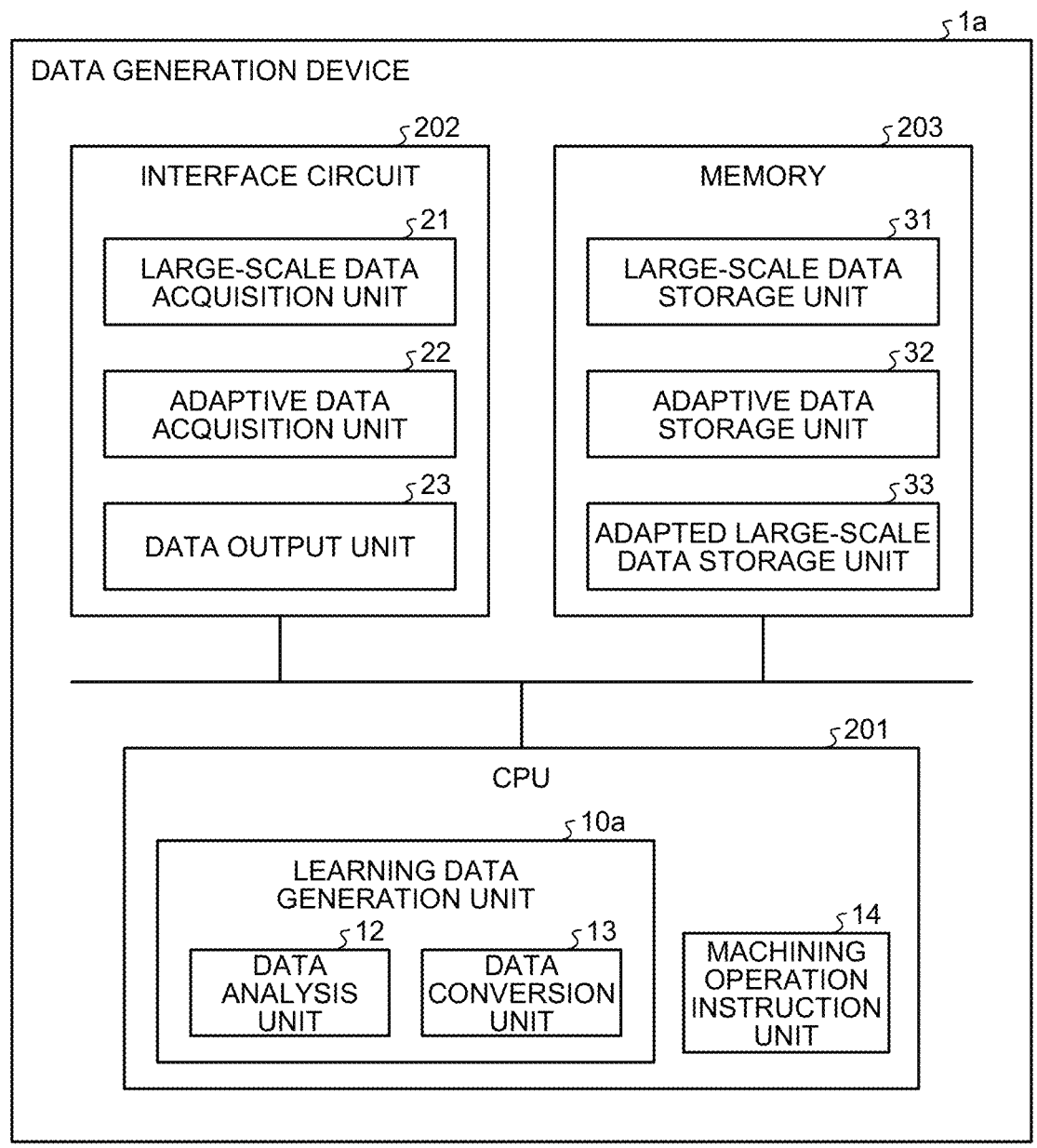
FIG. 6 is a diagram illustrating an example configuration of the data generation device according to the second embodiment.

FIG. 6 is a diagram illustrating an example configuration of the data generation device 1a according to the second embodiment. The data generation device 1a is configured to include a learning data generation unit 10a in place of the learning data generation unit 10 of the data generation device 1 according to the first embodiment, and to further include a machining operation instruction unit 14. The learning data generation unit 10a is the learning data generation unit 10 with the data extraction unit 11 removed. Note that the adaptive data acquisition unit 22 of the data generation device 1a obtains the adaptive data 70 and 80, and stores the obtained adaptive data 70 and 80 in the adaptive data storage unit 32.

The data analysis unit 12 and the data conversion unit 13 of the learning data generation unit 10a perform similar operations to the operations performed by the data analysis unit 12 and the data conversion unit 13 of the learning data generation unit 10 described in the first embodiment, but the data analysis unit 12 processes different data from the data in the first embodiment. That is, the data analysis unit 12 of the learning data generation unit 10a analyzes the adaptive data 70 and 80 to obtain feature quantities and calculate the offset "s" for use in the conversion processing in the data conversion unit 13.

The machining operation instruction unit 14 notifies the laser processing machines 90A and 90B of the machining condition, and instructs the laser processing machines 90A and 90B to perform machining under the notified machining condition and generate the adaptive data.

The data generation device 1a operates as illustrated in the flowchart of FIG. 7. FIG. 7 is a flowchart illustrating an operation of generating adapted large-scale data performed by the data generation device 1a according to the second embodiment. Note that steps S13 and S14 illustrated in FIG. 7 are the same as steps S13 and S14 illustrated in FIG. 4 described in the first embodiment. Description of steps S13 and S14 will therefore be omitted.

The data generation device 1a first causes the device type A to perform machining under the machining condition "c", and collects the adaptive data $D_c^{(A)}$ (step S21). At this step S21, the machining operation instruction unit 14 notifies the laser processing machine 90A of device type A of the machining condition "c", and instructs the laser processing machine 90A to generate the adaptive data. When the laser processing machine 90A having received this instruction completes generation of the adaptive data $D_c^{(A)}$, the adaptive data acquisition unit 22 obtains the obtained adaptive data $D_c^{(A)}$ and stores this same in the adaptive data storage unit 32.

The data generation device 1a next calculates the average vector $\mu_c^{(A)}$ of the adaptive data $D_c^{(A)}$ (step S22). At this step S22, the data analysis unit 12, for example, performs filter bank analysis described in the first embodiment on the adaptive data $D_c^{(A)}$ to thereby obtain an n-dimensional feature quantity, and then calculates the average vector $\mu_c^{(A)}$ from the n-dimensional feature quantity.

The data generation device 1a next causes the device type B to perform machining under the machining condition "c", collects the adaptive data $D_c^{(B)}$ (step S23), and calculates the average vector $\mu_c^{(B)}$ of the adaptive data $D_c^{(B)}$ (step S24). Step S23 is performed similarly to step S21 described above, and step S24 is performed similarly to step S22 described above.

The data generation device 1a performs foregoing steps S21 to S24 and subsequently steps S13 and S14 to thereby generate the adapted large-scale data.

As described above, in the machine learning system 100a according to the second embodiment, the data generation device 1a causes the device type A and the device type B to perform machining under the same machining condition, collects observation data, and calculates an offset for use in the conversion processing on the large-scale data 50 on the basis of the observation data collected. This provides an advantage similar to the advantage of the first embodiment, and enables more precise conversion of the large-scale data 50 than in the first embodiment, thereby enabling machine learning that uses adapted large-scale data to be more precise.

The configurations described in the foregoing embodiments are merely examples. These configurations may be combined with a known other technology, and configurations of different embodiments may be combined together. Moreover, a part of the configurations may be omitted and/or modified without departing from the spirit thereof.

REFERENCE SIGNS LIST 1, 1a data generation device; 2 machine learning device; 3 determination model; 10 learning data generation unit; 11 data extraction unit; 12 data analysis unit; 13 data conversion unit; 14 machining operation instruction unit; 21 large-scale data acquisition unit; 22 adaptive data acquisition unit; 23 data output unit; 31 large-scale data storage unit; 32 adaptive data storage unit; 33 adapted large-scale data storage unit; 50 large-scale data; 51, 61 observation data; 52, 62 machining state data; 53, 63 machining condition data; 60, 70, 80 adaptive data; 90A, 90B laser processing machine; 91A, 91B sensor; 100, 100a machine learning system; 201 CPU; 202 interface circuit; 203 memory; 300 machining state estimation device; 301 state estimation unit.

The invention claimed is:

1. A data generation device to generate learning data for learning a determination model for estimating a machining state of a workpiece on a basis of: observation data on at least one of a sound and a vibration produced during machining on the workpiece by a machine tool; and a machining condition used in the machining on the workpiece by the machine tool, the data generation device comprising:
a large-scale data acquisition circuit to obtain large-scale data, the large-scale data being large-scale learning data used in learning of a first determination model for determining a first machining state of a first workpiece machined by a first machine tool;
an adaptive data acquisition circuit to obtain adaptive data for use in generation of learning data for use in learning of a second determination model for determining a second machining state of a second workpiece machined by a second machine tool; and
a processor to convert the large-scale data on a basis of the adaptive data to generate adapted large-scale data for use in learning of the second determination model,
wherein the processor performs a machining operation instruction process of instructing the first machine tool and the second machine tool to perform machining under a same machining condition, wherein
the adaptive data acquisition circuit obtains, from the first machine tool having performed machining according to a first instruction from the machining operation instruction process, learning data generated during the performance of the machining, and
the adaptive data acquisition circuit obtains, from the second machine tool having performed machining according to a second instruction from the machining operation instruction process, learning data generated during the performance of the machining, the learning data obtained from the first and second machine tools being the adaptive data, and
the processor further performs:
a data analysis process of analyzing the learning data obtained by the adaptive data acquisition circuit from each of the first machine tool and the second machine tool to obtain a difference between observation data included in the learning data obtained from the first machine tool and observation data included in the learning data obtained from the second machine tool, the difference resulting from a difference between device types of machine tools used for collection of the observation data; and
a data conversion process of converting the large-scale data into the adapted large-scale data on the basis of the difference.

2. The data generation device according to claim 1, wherein each of the large-scale data and the adaptive data includes the learning data that includes the observation data on the at least one of the sound and the vibration and the machining condition, the processor performs:
- a data extraction process of extracting, from the large-scale data and the adaptive data, learning data including a machining condition within a predetermined range;
- a data analysis process of analyzing the learning data extracted by the data extraction process to obtain a difference between observation data included in the large-scale data and observation data included in the adaptive data, the difference resulting from a difference between device types of machine tools used for collection of the observation data included in the large-scale data and the observation data included in the adaptive data; and
- a data conversion process of converting the large-scale data into the adapted large-scale data on the basis of the difference.

3. The data generation device according to claim 2, wherein
the data analysis process includes calculating an offset, the offset being a difference between an average of feature quantities of the observation data included in each piece of the learning data extracted from the large-scale data and an average of feature quantities of the observation data included in each piece of the learning data extracted from the adaptive data, and
the data conversion process includes generating the adapted large-scale data by subtracting the offset from each of the feature quantities of the observation data included in the large-scale data.

4. The data generation device according to claim 2, wherein
each piece of the observation data included in the large-scale data and the observation data included in the adaptive data that are included in the learning data analyzed by the data analysis process is data obtained through observation during machining of workpieces of the same material into the same shape.

5. The data generation device according to claim 2, wherein
the learning data includes label data showing a machining state of the first or second workpiece, and
the data analysis process includes calculating, for each piece of the learning data extracted from the large-scale data, an average of feature quantities of first observation data associated with label data indicating that the machining state is a normal state and an average of feature quantities of second observation data associated with label data indicating that the machining state is an anomalous state,
the data analysis process includes calculating, for each piece of the learning data the data analysis process includes calculating, for each piece of the learning data extracted from the adaptive data, an average of feature quantities of third observation data associated with label data indicating that the machining state is a normal state and an average of feature quantities of fourth observation data associated with label data indicating that the machining state is an anomalous state, and
the data analysis process includes calculating an offset on the basis of the calculated averages, the offset being a difference between an average of feature quantities of the first and second observation data included in each piece of the learning data extracted from the large-scale data and an average of feature quantities of the third and fourth observation data included in each piece of the learning data extracted from the adaptive data.

6. The data generation device according to claim 5, wherein
the label data includes information on a type of anomaly when indicating that the machining state is an anomalous state.

7. The data generation device according to claim 2, wherein
the data extraction process includes extracting, from the large-scale data and the adaptive data, learning data including machining conditions within each of a plurality of predetermined targeted ranges, and
the data analysis process includes calculating, for each of the ranges, an average of feature quantities of observation data included in each piece of the learning data extracted from the large-scale data,
the data analysis process includes calculating, for each of the ranges, an average of feature quantities of observation data included in each piece of the learning data
the data analysis process includes calculating, for each of the ranges, an average of feature quantities of observation data included in each piece of the learning data extracted from the adaptive data, and
the data analysis process includes calculating an offset on the basis of the calculated averages, the offset being a difference between an average of feature quantities of the observation data included in each piece of the learning data extracted from the large-scale data and an average of feature quantities of the observation data included in each piece of the learning data extracted from the adaptive data.

8. A machine learning system comprising:
the data generation device according to claim 1; and
a machine learner to learn the second determination model according to the adapted large-scale data generated by the data generation device.

9. A machining state estimation system comprising:
the data generation device according to claim 1;
a machine learner to learn the second determination model according to the adapted large-scale data generated by the data generation device; and
a state estimator to estimate a machining state of a workpiece machined by the second machine tool, using the second determination model learned by the machine learner.

* * * * *